Nov. 5, 1957  R. B. BUCHNER  2,812,383
CIRCUIT-ARRANGEMENT FOR USE IN
AUTOMATIC SIGNALLING SYSTEMS
Filed March 1, 1952
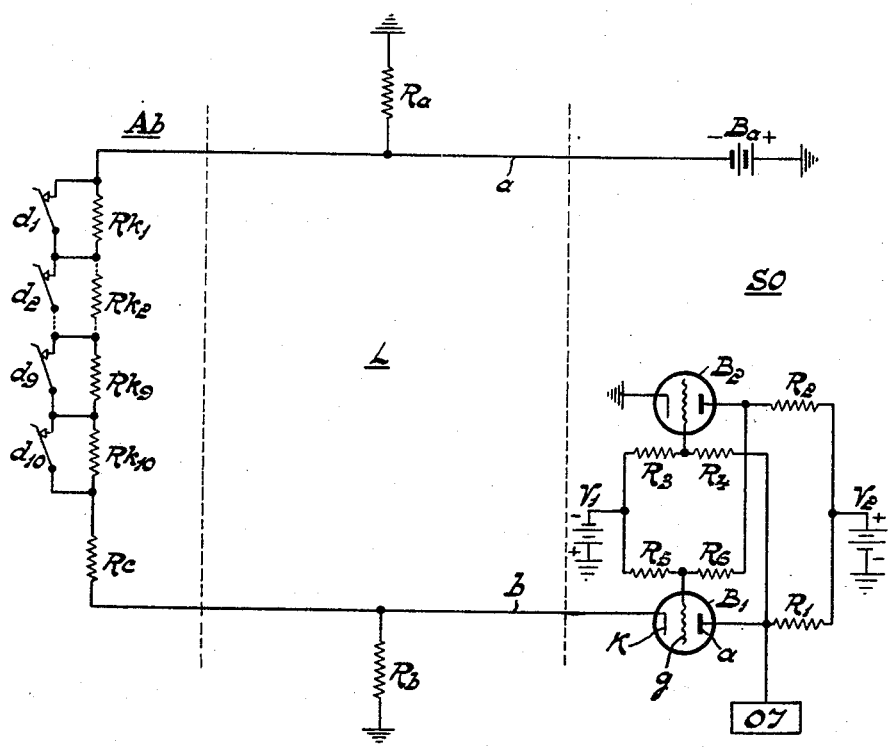
INVENTOR
Robert Bertold Buchner
By
Agent

United States Patent Office 2,812,383
Patented Nov. 5, 1957

2,812,383

CIRCUIT-ARRANGEMENT FOR USE IN AUTOMATIC SIGNALLING SYSTEMS

Robert Bertold Buchner, Hilversum, Netherlands, assignor, by mesne assignments, to North American Philips Company, Inc., New York, N. Y., a corporation of Delaware Application March 1, 1952, Serial No. 274,384

Claims priority, application Netherlands April 10, 1951

3 Claims. (Cl. 179—16)

The invention relates to circuit-arrangements for use in automatic signalling systems, more particularly telephone systems, for the transmission of dial signals, which correspond, for example, to given digits, from a substation, for example, a subscriber's station to a signal receiver, for example a register in a telephone exchange, through a connecting line comprising two conductors.

Circuit-arrangements are known in which the dial signals are produced by connecting resistors in the subscriber's set, the values of which are characteristic of the digits to be dialled, with the use of press-buttons in series with the line, the signal receiver comprising means for testing the values of the resistors connected. These circuit-arrangements are, in general, such that one line conductor is directly connected to a first terminal of a supply source and the other line conductor is connected through a resistor to a second terminal of the supply source and that the signal receiver tests the voltage of the other line conductor.

A circuit-arrangement is also known in which one line conductor is connected to a source of voltage differing from earth potential and the other line conductor is connected to earth, through a series combination of windings of relays having different sensitivities.

With circuit-arrangements of the kind described above, the difficulty arises that in practice a varying leakage occurs from the line conductors to earth and adversely affects the accuracy of the test. The effect of the leakage resistance between earth and the line conductor, which is directly connected to the supply source, may, in general, be neglected, since this resistance is in parallel with the supply source and the current passing through the resistance does not pass through the dial resistor in the subscriber's set. This current produces, it is true, a slight additional voltage drop across the line conductor concerned, but the resistance of this conductor is only low and, in practice, much smaller than the leakage resistance. The leak resistance between the other conductor and earth is in parallel with the test device and part of the current passing through the dial resistor is conducted away to earth through the leakage resistance outside the test device. Since the leak resistance is not constant, but differs, for example, for different lines and varies with time for the same line, the said part of the test current is not constant. This results in that the number of different dial resistors, which the test device is capable of distinguishing with certainty, is restricted and in practice it is smaller than the number of criteria required to be transmissible.

In the known circuit-arrangements, the solution has been found in that, when dialling a digit at the subscriber's station a plurality of resistors is switched on and the resistors are tested in succession by the signal receiver. These circuit-arrangements may, for example, be such that the resistors in the subscriber's apparatus are switched on in succession. In other circuit-arrangements the subscriber's apparatus comprises one or more rectifiers, which are combined with dial resistors in such manner that, when choosing a digit, the resistance offered is different for opposite directions of the current and the signal receiver tests these resistances in succession by commutation of the line supply current. These solutions have various disadvantages, since on the one hand the push-button mechanism in the subscriber's apparatus becomes more complicated and on the other hand particular measures are required for the signal receiver to be capable of testing the resistors sufficiently rapidly. In the system in which the line supply current is switched on, there is, moreover, an additional risk of cross-talk interference, due to the great variations of line potential.

The object of the invention is to provide an improved circuit arrangement for use in automatic signalling systems. According to the invention, a circuit-arrangement for use in an automatic signalling system, more particularly a telephone system, for the transmission of dial signals from a sub-station to a signal receiver through a connecting line comprising two conductors, by connecting dial resistors in the substation in series with the line, one line conductor being connected at the signal receiver to a source of voltage differing from earth potential, the other line conductor being connected in the signal receiver to a device for testing the current passing through said other line conductor, is characterized in that said other line conductor is connected to the cathode of a discharge tube, the control-electrode of which is at a potential such that whichever dial resistor is switched in the potential of said cathode is approximately equal to earth potential and in that provision is made of means for testing the current through an output circuit of the tube.

Consequently, during the test, no or substantially no current will flow to earth through the leakage resistance of said other line. The potential difference between the cathode and earth is preferably smaller than 1/10 of the voltage of the said supply source.

In order that the invention may be more clearly understood and readily carried into effect, it will now be described more fully with reference to the accompanying diagrammatic drawing, given by way of example, in which only those elements are shown, which are required for a good understanding of the invention.

Referring now to the figure, a subscriber's apparatus Ab is connected through a connecting line L comprising two intelligence conductors $a$ and $b$ and through further connecting means (not shown), for example, one or more call finders, relay contacts and the like, to a signal receiver SO in a register of a remote telephone exchange. The apparatus Ab comprises a number, for example, ten dial resistors $Rk_1$ to $Rk_{10}$, which the subscriber can connect in series with the line L, when choosing a number by means of push-buttons $d_1$ to $d_{10}$. A resistor Rc is connected in series with these resistors to compensate for the line resistance. The value of this resistor is chosen to be such that the sum of the resistances of the line conductors $a$ and $b$ and the resistance of Rc has a definite fixed value, for example, 1,000 ohms. The line conductor $a$ is connected to the negative terminal of the central battery Ba, the positive terminal of which is connected to earth. The line conductor $b$ is connected to the cathode $k$ of a discharge tube $B_1$, of which the anode is fed through an output circuit comprising a resistor $R_1$ from a supply source $V_2$. Provision is made of a device OI, which may be of a kind known per se for testing the voltage of the anode $a$ of tube $B_1$. The intelligence conductors $a$ and $b$ have a certain natural leakage to earth, which is shown in the figure by leakage resistors Ra and Rb, the values of which may in practice vary, for example, between 20,000 ohms and infinity.

It is first assumed that the control-grid $g$ of tube $B_1$ is connected to a source of low constant negative voltage (not shown), for example, −1.5 v. with reference to earth potential. If the subscriber lifts the receiver, none of the dial buttons being depressed, the resistance of the subscriber's set is comparatively low and a certain current flows from the battery $Ba$ through the intelligence conductor $a$, the apparatus $Ab$, the intelligence conductor $b$, the discharge path between the cathode and the anode of tube $B_1$ and the resistor $R_1$ to the supply source $V_2$. The voltage at the cathode of tube $B_1$ and hence that at the intelligence conductor $b$ is then approximately equal to earth potential, or has, for example, a small positive value. Substantially no current then flows through the leakage resistors $Ra$ and $Rb$, the leakage current, if any, being very small with respect to the current passing through the tube $B_1$. If one of the resistors $Rk_1$ to $Rk_{10}$ is connected in series with the line by depression of one of the push-buttons $d_1$ to $d_{10}$, the current through the line loop and the tube $B_1$ drops. The tube $B_1$ constitutes a load for the conductor $b$, of which the resistance value is equal to the reciprocal value of the mutual conductance. With a mutual conductance of, for example, 8 ma./v., the signal receiver consequently constitutes an apparent load resistance for the intelligence conductor of 125 ohms, i. e. practically a short-circuit to earth. With a variation of the current passing through the line loop of, for example, 20 ma., the cathode voltage and the voltage of the conductor $b$ vary only by 2.5 v., so that even when a dial resistor is switched on, substantially no current flows away through the leak resistors $Ra$ and $Rb$. With variation of the value of the leakage resistor $Rb$ the current passing through the tube consequently varies only to a very small extent. The current passing through the resistor $Ra$ substantially does not affect the current passing through the line loop, since the resistor $Ra$ is in parallel with the battery $Ba$. The current passing through the line loop and the tube $B_1$ is, consequently substantially equal to the voltage of the battery $Ba$, divided by the total resistance of the line loop. A variation of the current through the tube $B_1$, due to the switching-in of a dial resistor $Rk$, produces a variation of the voltage drop across the resistor $R_1$, i. e. of the voltage at the anode $a$ of tube $B_1$, which is tested by the device OI. Although as a result of the low input resistance of tube $B_1$, the voltage at the cathode can vary only to a slight extent with variation of the current, a small current variation produces a comparatively great anode voltage variation, since the value of the resistor $R_1$ greatly exceeds the input resistance at the cathode K.

If the control-grid is at a constant potential, as has been assumed above, the signal receiver does not constitute a complete short-circuit of the conductor $b$ to earth, so that the leakage resistor $Rb$ is not entirely without effect, when any of the dial resistors is switched-in. Consequently, the leakage resistor $Rb$ affects the accuracy of the test to a certain extent. This effect may be reduced by further reducing the input resistance preferably to zero. For this purpose, the control grid $g$ in the circuit-arrangement shown is not connected to a constant voltage source, but it is included in a feedback circuit comprising an auxiliary tube $B_2$. The anode of tube $B_2$ is connected to the source $V_2$ by way of a resistor $R_2$. The control grid of tube $B_2$ is connected to a tapping of the potentiometer $R_3$, $R_4$ connected between the supply point $V_1$ and the anode $a$ of tube $B_1$. The control grid $g$ of tube $B_1$ is connected to a tapping of a potentiometer $R_5$, $R_6$, which is connected between point $V_1$ and the anode of tube $B_2$. If the control grid of tube $B_1$ had a constant voltage, the voltage at the cathode would increase if the resistances of the line loop were increased. Owing to the reduction of the current passing through the tube $B_1$, the voltage at the control grid of tube $B_2$ increases, however, so that the grid voltage of the tube $B_1$ drops, which tends to reduce the voltage at the cathode $k$. By a suitable choice of the elements of the circuit-arrangement and of the supply voltages, the voltage at the cathode $k$ is caused to be equal to earth potential through a wide range of current through tube $B_1$, in other words, the signal receiver constitutes an apparent virtual short-circuit of the conductor $b$ to earth, so that the effect of the leakage resistor $Rb$ may be negligible.

The following values of components may be used, by way of a preferred example, in the circuit diagram shown in the drawing:

$Rk_1 = 1500$ ohms
$Rk_2 = 1500 \times 1.2$ ohms
$Rk_9 = 1500 \times (1.2)^8$ ohms
$Rk_{10} = 1500 \times (1.2)^9$ ohms
$Ra = 15,000$ ohms
$Rb = 15,000$ ohms
$Rc = 1200$ ohms
$R_1 = 3,000$ ohms
$R_2 = 270,000$ ohms
$R_3 = 180,000$ ohms
$R_4 = 470,000$ ohms
$R_5 = 150,000$ ohms
$R_6 = 180,000$ ohms
$Ba = 60$ volts
$V_1 = 75$ volts
$V_2 = 180$ volts
$B_1$ and $B_2$ = Philips type 18040 tubes

What I claim is:

1. In an automatic telephony system; a substation, a signal receiver, and a line provided with two conductors connecting said substation to said receiver for the transmission of dial signals thereto; said substation comprising a plurality of series-connected dial resistors connected between the conductors of said line and a dial switch connected across each resistor to switch same into the line; said signal receiver comprising a source of voltage connecting one of said conductors to a point of ground potential, and a system for testing current flow through said line and including an electron discharge tube having a cathode, a control electrode and an output electrode, means connecting said cathode to the other of said conductors, an output circuit connected to said output electrode, a source of operating voltage connected to said output electrode through said output circuit, a testing device coupled to said output circuit to test current flow therein, and means to apply to said control electrode a potential having a value such that the potential of said cathode is maintained approximately equal to ground potential regardless of whichever dial resistor is switched into the line, thereby reducing the effect of line leakage resistance upon the current flow in said output circuit.

2. In an automatic telephony system; a substation, a signal receiver, and a line provided with two conductors connecting said substantion to said receiver for the transmission of dial signals thereto; said substation comprising a plurality of series-connected dial resistors connected between the conductors of said line and a dial switch connected across each resistor to switch same into the line; said signal receiver comprising a source of voltage connecting one of said conductors to a point of ground potential, and a system for testing current flow through said line and including an electron discharge tube having a cathode, a control electrode and an output electrode, means connecting said cathode to the other of said conductors, an output circuit connected to said output electrode, a source of operating voltage connected to said output electrode through said output circuit, a testing device coupled to said output circuit to test current flow therein, means to apply to said control electrode a potential having a value such that the potential of said cathode is maintained approximately equal to ground potential regardless of whichever dial resistor is switched into the line, and a feedback circuit between the output electrode and the control electrode to increase the potential of the control electrode when emission current in said tube increases, thereby reducing the effect of line leakage resistance upon the current flow in said output circuit.

3. Apparatus, as set forth in claim 2, wherein said feedback circuit includes an electron discharge tube having a cathode, a grid and an anode, said auxiliary tube cathode being connected to said point of ground potential, means coupling said grid to said output circuit, and means coupling said anode to said control electrode.

References Cited in the file of this patent

UNITED STATES PATENTS

| | | |
|---|---|---|
| 1,761,115 | Gardner | June 3, 1930 |
| 2,438,496 | Deakin | Mar. 30, 1948 |
| 2,461,200 | Dubuar | Feb. 8, 1949 |
| 2,476,534 | Cox | July 19, 1949 |
| 2,620,401 | Vigren et al. | Dec. 2, 1952 |
| 2,640,883 | Buchner | June 2, 1953 |
| 2,676,210 | Oberman et al. | Apr. 20, 1954 |